United States Patent
Galli et al.

(10) Patent No.: US 12,519,825 B2
(45) Date of Patent: Jan. 6, 2026

(54) PROOF-OF-WORK TECHNIQUES FOR VALIDATING ONLINE ACTIVITIES

(71) Applicant: KOUNT INC., Boise, ID (US)

(72) Inventors: Christopher John Galli, Boise, ID (US); James Gregory Davis, Boise, ID (US); Arthur Jacob Putnam, Boise, ID (US)

(73) Assignee: KOUNT INC., Boise, ID (US)

( * ) Notice: Subject to any disclaimer, the term of this patent is extended or adjusted under 35 U.S.C. 154(b) by 271 days.

(21) Appl. No.: 18/007,148

(22) PCT Filed: Jul. 21, 2021

(86) PCT No.: PCT/US2021/042659
§ 371 (c)(1),
(2) Date: Jan. 27, 2023

(87) PCT Pub. No.: WO2022/026273
PCT Pub. Date: Feb. 3, 2022

(65) Prior Publication Data
US 2023/0229767 A1    Jul. 20, 2023

Related U.S. Application Data

(60) Provisional application No. 63/057,035, filed on Jul. 27, 2020.

(51) Int. Cl.
*H04L 29/06* (2006.01)
*H04L 9/40* (2022.01)

(52) U.S. Cl.
CPC .............................. *H04L 63/1458* (2013.01)

(58) Field of Classification Search
None
See application file for complete search history.

(56) References Cited

U.S. PATENT DOCUMENTS 8,112,483 B1 *  2/2012  Emigh ................. G06F 21/36
                                                713/182
9,807,092 B1 * 10/2017  Gutzmann ............ H04L 63/20
(Continued)

FOREIGN PATENT DOCUMENTS

WO    WO-2021112827 A1 *  6/2021  ........... G06F 16/958

OTHER PUBLICATIONS

PCT/US2021/042659, "International Search Report and Written Opinion", Nov. 29, 2021, 18 pages.
(Continued)

*Primary Examiner* — Benjamin E Lanier
(74) *Attorney, Agent, or Firm* — Kilpatrick Townsend & Stockton LLP

(57) ABSTRACT

Systems and methods for validating online activities through proof-of-work techniques are provided. In one example, a validating computing system receives a request for a proof-of-work instruction from a client device that has submitted an online activity request to an online server system. The validating computing system generates and transmits a proof-of-work instruction for solving a problem to the client device. The validating computing system further receives a response to the proof-of-work instruction from the client device. The validating computing system generates a validity decision based on whether the client device correctly solved the problem, and transmits, to the online server system, the validity decision for use in granting the online activity request to the online server system.

18 Claims, 8 Drawing Sheets

(56) References Cited

U.S. PATENT DOCUMENTS

2015/0347731 A1    12/2015  Paxton et al.
2018/0089465 A1*  3/2018  Winstrom ............. H04L 9/3247

OTHER PUBLICATIONS

PCT/US2021/042659, "International Preliminary Report on Patentability", Feb. 9, 2023, 13 pages.
PCT/US2021/042659, "Invitation to Pay Additional Fees and, Where Applicable, Protest Fee", Oct. 8, 2021, 6 pages.
European Application No. EP21755215.7 , Office Action, Mailed on Jun. 24, 2025, 8 pages.

* cited by examiner

DATA CAPTURE EXAMPLE

MOUSE STARTING COORDINATES (61, 187)
X COORD PATH:
254, 250, 241, 228, 210, 189, 176, 153, 141, 120, 110, 101, 95, 90, 86, 83...
Y COORD PATH:
51, 52, 57, 63, 74, 85, 93, 108, 116, 131, 139, 147, 153, 157, 161, 163, 167...
SHAPE TARGET AT COORDS (50, 200)
SHAPE FIT AT COORDS (56, 186)
SHAPE NOISE AT COORDS (250, 200)

*FIG. 5*

PROOF-OF-WORK TECHNIQUES FOR VALIDATING ONLINE ACTIVITIES

CROSS-REFERENCE TO RELATED APPLICATIONS

This application claims the benefit and priority of U.S. Provisional Application No. 63/057,035 filed Jul. 27, 2020, the contents of which are herein incorporated by reference as if set out below.

TECHNICAL FIELD

The present disclosure relates generally to cybersecurity. More specifically, but not by way of limitation, this disclosure relates to proof-of-work (PoW) techniques for validating online activities, thereby detecting and preventing fraudulent or malicious activities in online systems.

BACKGROUND

Fraudulent or malicious online actors attempting to perpetrate digital fraud or other attacks often use automated scripts, also referred to as bots. The automated scripts allow these fraudulent or malicious online actors to use large numbers of attack vectors to launch automated attacks such as credential stuffing, credential cracking, token cracking, and account creation. These attacks can cause serious problems to online systems by preventing the online systems functioning properly or causing the online systems to grant attackers access to confidential or otherwise important data in the systems.

SUMMARY

Various aspects of the present disclosure provide systems and methods for validating online activities through proof-of-work techniques. In one example, a validating computing system receives, from a client device, a request for a proof-of-work instruction. The request is associated with an online activity request submitted to an online server system to request performing an online activity in an online computing environment provided by the online server system. The validating computing system generates a proof-of-work instruction in response to the request and transmits the proof-of-work instruction to the client device. The proof-of-work instruction specifies a problem to be solved by the client device without human intervention. The validating computing system further receives, from the client device, a response to the proof-of-work instruction, generates a validity decision based on determining that the client device correctly solves the problem based on the response to the proof-of-work instruction, and transmits, to the online server system, the validity decision for use in granting the online activity request to perform the online activity in the online computing environment.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

FIG. 5 shows an example of the heuristic data collected during the process of solving the proof-of-work problem in FIG. 3, according to some aspects described herein.

DETAILED DESCRIPTION

Figure 1:
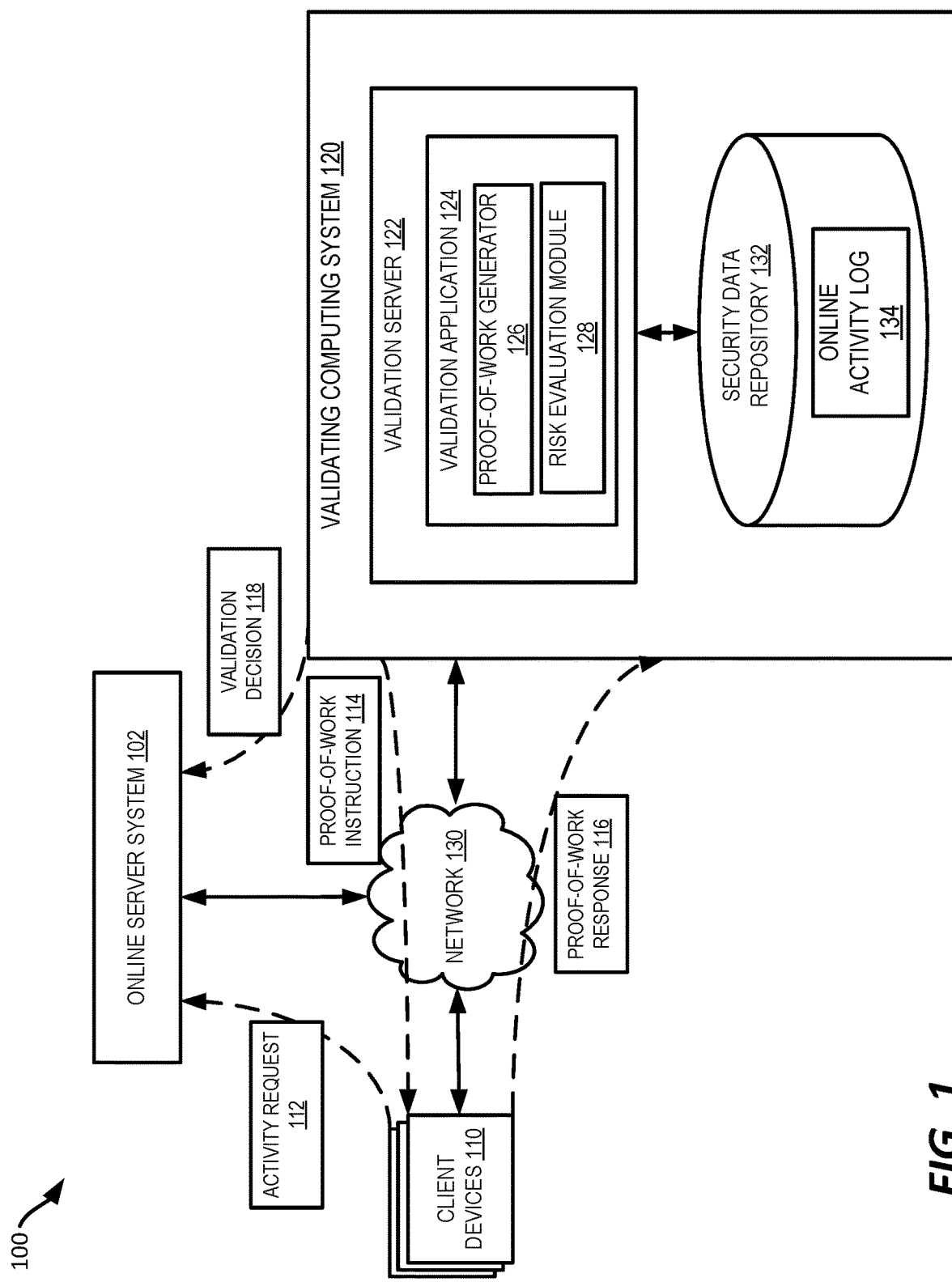
FIG. 1 is a diagram of an example of a computing environment in which online activities are validated via proof-of-work techniques, according to some aspects described herein.

Certain aspects and features of the present disclosure involve validating online activities through proof-of-work techniques. To solve the security problems associated with online systems discussed above, the proof-of-work techniques can be employed to validate a request for an online activity from a client device by requesting the device to solve proof-of-work problems. Different from legitimate online users, attackers often use scripted bots to submit the requests. These automated attack tools often lack a user agent such as a web browser, lack document object model (DOM) interaction by a user agent, and lack a JavaScript engine or JavaScript execution. The attack profiles often depend upon expected parameter and variable names. For example, these automated scripts often have static configurations that parse network data and look for known patterns to extract information for use in subsequent steps of the attack.

The proof-of-work problems can be designed to be simple for legitimate client devices to complete, but difficult for automated scripts to complete. The problem type and problem arguments in the problem may be dynamic, such that it is difficult for an automated script to predict a problem solution or even the type of problem. Additionally, the system may obfuscate the proof-of-work problem, such as by changing variable names or requiring a data transformation of a solution to the proof-of-work problem, which increases the difficulty for automated scripts to complete the proof-of-work task.

For example, a validating computing system may receive from a client device a request for a proof-of-work instruction. Such a request may be triggered when the client device requests for permission to perform an online activity in the online computing environment of a server system, such as browsing the content of a website, logging into a user account, making an online purchase, and so on. In response to the online activity request, the server system transmits a response to the client device. The response may include a proof-of-work trigger for requesting proof-of-work instructions. A legitimate client device will be able to parse the response to identify the proof-of-work trigger thereby sending the request for a proof-of-work instruction. For bots with automated scripts that are not configured with the capability of parsing the response from the server system, no request for proof-of-work instruction will be sent which indicates that the corresponding request for online activity is from an illegitimate device and should be denied.

If the validating computing system does receive the request for a proof-of-work instruction, which may be from a legitimate device or a more sophisticated bot, the validating computing system can generate a proof-of-work instruction and transmit the proof-of-work instruction to the client device. If the request is from a web browser of the client device, the validating computing system can generate the proof-of-work instruction which includes a proof-of-work problem executable on the JavaScript engine of the web browser. If the request is from a native application of the client device, the proof-of-work instruction can include an instruction to execute the proof-of-work problem on the client device.

The proof-of-work problem may be a non-interactive problem that is transparent to a user of the client device and to be solved by the client device without human intervention. For example, the proof-of-work problem may be a mathematical calculation, such as addition, subtraction, multiplication, and so on. The proof-of-work problem can be made dynamic in that the problem (e.g., addition, subtraction, or multiplication) changes from request to request, and the parameters of the problem (i.e., the specific numbers) also change. The non-interactive proof-of-work problems may also include other problems such as sorting a list of numbers, finding the maximum or minimum number in a list, and so on. In some implementations, the proof-of-work instruction may further request that the solution to be hashed or otherwise obfuscated.

The client device receives the proof-of-work instruction and solves the proof-of-work problem indicted in the proof-of-work instruction accordingly. The client device further sends the solution as instructed to the validating computing system. In some cases, the client device also sends heuristic data associated with solving the problem, such as the time spent in solving the problem.

The validating computing system receives the solution and its associated heuristic data, if there is any, and determines whether the client device successfully solves the problem. In some examples, the client device successfully solves the problem if the solution matches a correct solution. In other examples, the client device successfully solves the problem if the solution matches the correct solution and the problem is solved within an acceptable time period. The acceptable time period may be set to be above a lower threshold of time, below an upper threshold amount of time, or both. The validating computing system may add other conditions to determine whether the client device successfully solve the proof-of-work problem.

If the validating computing system determines that the client device successfully solves the problem, the validating computing system can decide that the client device is a legitimate device; otherwise, the validating computing system may decide that the client device is not legitimate (e.g., it is a bot). In some examples, a device is legitimate if it is operated by a human rather than being controlled, assisted, or influenced by an automated system, such as a bot. The validating computing system further notifies the online server system of its decision. The online server system may approve or deny the online activity request of the client device based on the validity decision made by the validating computing system. The validating computing system may also store the validity decision and the data used to make the validity decision for later analysis.

In further examples, the validating computing system may also send an interactive proof-of-work problem to the client device in lieu of or in conjunction with the non-interactive proof-of-work problem. The interactive proof-of-work problem is designed to be presented in a user interface of the client device and solved by a user operating the client device by interacting with the user interface. The interactive proof-of-work problems can involve visual objects with different sizes, shapes or colors. Solving the interactive proof-of-work problems may involve dragging or moving one or more objects in the user interface. The interactive proof-of-work problems can also involve interaction with other senses, such as sound. For example, solving an interactive proof-of-work problem may involve matching an audio clip of a word to a written word displayed on the user interface.

The client device receives the solution through the user interface and records heuristic data associated with solving the problem. The heuristic data may include the start and end coordinates of the mouse or other use input device in the user interface, the intermediate coordinates of the user input device, the total time used in solving the problem, and so on. The solution and the heuristic data may be sent to the validating computing system for validation. The validating computing system can determine that the client device successfully solves the interactive proof-of-work problem if the solution matches the correctly solution and the heuristic data indicates that the interactive proof-of-work problem is solved by a real human. The validating computing system may make the validity decision based on the determination. For example, if only the interactive proof-of-work problem is sent to in the proof-of-work instruction, the validating computing system may decide that the client device is legitimate if the interactive proof-of-work problem is successfully solved. If both the non-interactive and interactive proof-of-work problems are sent in the proof-of-work instruction, the validating computing system may decide that the client device is legitimate using the results of both the non-interactive and interactive proof-of-work problems as well as the heuristic data included with the proof-of-work results. For example, the validating computing system may decide that the client device is legitimate if both the non-interactive and interactive proof-of-work problems are successfully solved. Alternatively or additionally, if the non-interactive proof-of-work problem is successfully solved but the interactive proof-of-work problem is not successfully solved, the validating computing system may determine that the client device is legitimate. For example, a human user of the client device may incorrectly solve the interactive proof-of-work problem, but may provide heuristic data indicative of a human user. The validating computing system may determine from the heuristic data, despite the incorrect solution, that the client device is legitimate.

In additional examples, multiple rounds of validation may be used to validate a client device. In one round, one or more of the non-interactive or interactive proof-of-work problems discussed above may be used. Based on the solution of the proof-of-work problem(s) provided in this round, the validating computing system may send another proof-of-work instruction with different proof-of-work problem(s). The difficulty levels of the proof-of-work problems can be configured to be increasing from one round to the next round. For example, a non-interactive proof-of-work problem can be used in a first round of validation and an interactive proof-of-work problem can be used in the second round. In another example, a simple non-interactive proof-of-work problem can be used in a first round of validation and a more difficult non-interactive proof-of-work problem can be used in the second round.

The proof-of-work scheme, including the number of rounds and the type (non-interactive or visual) of the proof-of-work problem, may be determined based on the security level of the requested online activity. For high-security-level activities, such as logging into an account with highly confidential information (e.g., bank account, credit/loan account), the validating computing system may employ a multi-round and multi-type validation. For low-security-level activities, such as browsing content of a web page, the validating computing system and the online server system may use a single-round and single-type scheme or may decide not to use the proof-of-work techniques. For middle-security-level activities, the validating computing system may use a single-round and single-type scheme, a single-round and multi-type scheme, or a multi-round and single-type scheme. Other configurations can also be employed.

Certain aspects provide improvements to the security of online computing environment by using proof-of-work techniques to validate a client device requesting an online activity in the computing environment. As discussed above, online systems often suffer various automated attacks such as credential stuffing, credential cracking, token cracking, and account creation. These attacks are problems specific to online computing environments, and some embodiments can use proof-of-work techniques that are uniquely suited for addressing security issues for online computing environments.

The technologies can allow attackers with automated scripts to be detected and thereby prevent the access of the attackers to the systems. More specifically, the proof-of-work problems can be designed to be simple for legitimate client devices to complete, but difficult for automated scripts to complete. The problem type and problem arguments of the problem may be dynamic, such that it is difficult for an automated script to predict a problem solution or even the type of problem. Additionally, the system may obfuscate the proof-of-work problem, such as by changing variable names or requiring a data transformation of a solution to the proof-of-work problem, which increases the difficulty for automated scripts to complete the proof-of-work problem.

In addition, different types of proof-of-work problems including non-interactive and interactive proof-of-work problems, can be used jointly or in sequence to adapt to different scenarios. For example, simple automated scripts may be detected through a simple non-interactive proof-of-work problem. More advanced automated scripts may require more difficult proof-of-work problems or different types of proof-of-work problems to detect. For instance, an advanced automated script may be able to solve a non-interactive proof-of-work problem successfully, but they may not solve an interactive proof-of-work problem correctly or solve it in a non-human-like manner. As such, using different types of proof-of-work problems can further improve the detection of the automated scripts thereby further improving the security of the online systems.

The illustrative examples herein are given to introduce the reader to the general subject matter discussed and are not intended to limit the scope of the disclosed concepts. The following sections describe various additional features and examples with reference to the drawings in which like numerals indicate like elements, and in which descriptions are used to describe the illustrative examples but, like the illustrative examples, should not be used to limit the present disclosure.

Operating Environment Example for Validating Online Activities Through Proof-Of-Work Techniques Referring now to the drawings, FIG. 1 is a diagram of an example of a computing environment 100 in which online activities are validated via proof-of-work (PoW) techniques, according to some aspects described herein. The computing environment 100 shown by FIG. 1 includes an online server system 102, one or more client devices 110, a validating computing system 120, and a network 130. In alternative configurations, different and/or additional components may be included in the computing environment 100.

The client devices 110 may be a computing device or other communication device operated by a user, such as a consumer or a customer. The client devices 110 can include one or more computing devices, such as laptops, smartphones, or other personal computing devices. Alternatively, a client device 110 may be a device having computer functionality, such as a personal digital assistant (PDA), a mobile telephone, or another suitable device. A client device 110 can include executable instructions stored in one or more non-transitory computer-readable media. The client device 110 can be configured to communicate with other computing systems, such as the online server system 102 and the validating computing system 120, via the network 130. The client device 110 can also include one or more processing devices that are capable of executing program code to perform operations described herein. In various examples, the client device 110 can allow a user to access certain online services from an online server system 102 or other computing resources, to engage in mobile commerce with the online server system 102, to obtain controlled access to electronic content hosted by the online server system 102, or for other purposes.

The online server system 102 may include one or more third-party devices, such as individual servers or groups of servers operating in a distributed manner. An online server system 102 can include any computing device or group of computing devices operated by a seller, lender, or other provider of products or services. The online server system 102 may include one or more server devices. The one or more server devices can include or can otherwise access one or more non-transitory computer-readable media. The online server system 102 can also execute instructions that provide an interactive computing environment accessible to client devices 110. Examples of the interactive computing environment include a mobile application specific to a particular client device 110, a web-based application accessible via the client device 110, or the like. The executable instructions are stored in one or more non-transitory computer-readable media. In some aspects, the executable instructions for the interactive computing environment can include instructions that provide one or more graphical interfaces. The graphical interfaces are used by a client device 110 to access various functions of the interactive computing environment. For instance, the interactive computing environment may transmit data to and receive data from a client device 110 to shift between different states of the interactive computing environment, where the different states allow one or more electronics transactions between the client device 110 and the online server system 102 to be performed.

In some aspects, a client device 110 executes an application allowing a user of the client device 110 to interact with the online server system 102. For example, a client device 110 executes a browser application to enable interaction between the client device 110 and the online server system 102 via the network 130. In another aspect, a client device 110 interacts with the online server system 102 through an application programming interface (API) running on a native operating system of the client device 110, such as IOS®, or ANDROID™. In some aspects, one or more of the client devices 110 may be running an automated script configured to perpetrate fraud on the online server system 102. The online server system 102 may communicate information to a validating computing system 120 identifying the client device 110 or describing interactions between the online server system 102 and the client device 110. The validating computing system 120 may use the information to determine if the client device 110 is legitimate or fraudulent.

The validating computing system 120 may include a validation server 122 that includes a validation application 124. The validation server 122 can include one or more processing devices that execute program code, such as a validation application 124. The validation application 124 may execute modules such as a proof-of-work generator 126 and a risk evaluation module 128. The validating computing system 120 may also include a security data repository 132 that includes an online activity log 134. In some aspects, the validating computing system 120 may include additional, fewer, or different components for various applications. In some aspects, some or all of the components and related functions of the validating computing system 120 may be components of the online server system 102. Additionally or alternatively, the validating computing system 120 and the online server system 102 may be included in a single system.

A client device 110 may transmit an activity request 112 to the online server system 102 via the network 130. In response to the activity request 112, the online server system 102 may transmit a response to the client device 110. The response may include a proof-of-work trigger. In some examples where the online server system 102 and the validating computing system 120 share a code library (such as a JavaScript library), the response including the proof-of-work trigger may originate from the code library and be delivered via the validating computing system 120 to the client device 110. The proof-of-work trigger may include a directive to request a proof-of-work instruction 114 from the validating computing system 120. If the client device 110 is an automated script, the client device 110 may not detect the directive to request the proof-of-work instruction 114, and thus may not request the proof-of-work instruction 114. If the client device 110 is a legitimate user device, the client device 110 may detect the directive and request the proof-of-work instruction 114 from the validating computing system 120 via the network 130.

In some examples, each time a client device performs an online activity including transmitting an activity request 112 to the online server system 102, the validating computing system 120 may receive, from the online server system 102, the client device 110, or both, activity attributes associated with the online activities. For example, the activity attributes may include an IP address, a session ID, a time stamp, user ID, network attributes of the activity, device characteristics, behavioral characteristics, ID of the online server system 102, items purchased, transaction amount, an email address, phone number, physical address, or some combination thereof. The security data repository 132 may be configured to receive and store the activity attributes in the online activity log 134.

The online activity log 134 may include one or more databases that may be configured to store activity data associated with activities performed by users through the client devices 110, including the activity attributes. The activity data may include actions a user performs via an application associated with the online server system 102 and executing on the client device 110. The activity data may include a fraud attribute for an activity performed by a user. The fraud attribute may indicate whether the activity was determined to be fraudulent. The fraud attribute may be created at the time of the creation of the activity attributes. In some aspects, the fraud attribute may be added to previously stored activity attributes to indicate that an activity was determined to be fraudulent after the fact.

In response to receiving the request for the proof-of-work instruction 114 from the client device 110, the validation application 124 of the validating computing system 120 may use the proof-of-work generator 126 to generate the proof-of-work instruction 114 to be completed by the client device 110. The proof-of-work instruction 114 may include a problem to be solved by the client device 110. In some aspects, the problem may be represented by a function configured to be executed quickly by the client device 110. For example, the function may be configured to be executed in less than one second, or in less than one millisecond. The function may include a simple arithmetic problem, such as an addition, subtraction, multiplication, or division equation. The problem may include a cryptographic puzzle. For example, the problem may be a request to perform hashing operations on a provided dynamic value to find a number solution that satisfies a difficulty target. The problem may include an instruction to sort a list, such as to arrange a list of words in alphabetical order or to arrange a list of numbers in numerical order. The problem may include an instruction to search for values in a dataset and confirm the presence or absence of the values in the dataset. The problem may include bit shifting or bitwise operations. The problem may utilize known computation capabilities of the client device, such as to compute WebGL Hash of a supplied image. Many different problem types may be utilized by the proof-of-work generator 126. The problem type and problem arguments may be dynamically selected by the proof-of-work generator 126.

If the client device 110 interacts with the online server system 102 through an API running on a native operating system of the client device 110, the proof-of-work generator 126 may generate the proof-of-work instruction 114 such that the proof-of-work instruction 114 may only include instructions for solving the problem. Alternatively, if the client device 110 executes a browser application to enable interaction between the client device 110 and the online server system 102, the proof-of-work generator 126 may generate the proof-of-work instruction 114 such that the proof-of-work instruction 114 includes the function written in JavaScript so that the function can be executed in the JavaScript engine of the browser application.

The risk evaluation module 128 in the validation application 124 of the validating computing system 120 may be configured to calculate a solution to the proof-of-work instruction 114. The risk evaluation module 128 may store the solution in the online activity log 134.

The validating computing system 120 may transmit the proof-of-work instruction 114 to the client device 110 via the network 130. The proof-of-work instruction 114 may identify the type of the problem and the inputs for the problem. For example, the proof-of-work instruction 114 may identify the problem type as "addition" and the inputs as "4" and "5." The proof-of-work instruction 114 may instruct the client device 110 to process the problem and submit a proof-of-work response 116 including the solution to the validating computing system 120 via the network 130. If the client device 110 is an automated script, the client device 110 may not be capable of processing the problem, or may send an incorrect solution to the problem. If the client device 110 is a legitimate user device, the client device may submit a proof-of-work response 116 including a correct solution to the validating computing system via the network 130. The client device 110 may complete the proof-of-work response 116 without displaying the problem or otherwise indicating to a user that the client device 110 is completing the proof-of-work response 116. Thus, a human user may be unaware that the proof-of-work response 116 is being completed by the client device 110. This type of proof-of-work is also referred to herein as a non-interactive proof-of-work.

In some examples, the validating computing system 120 may also send an interactive proof-of-work problem to the client device 110 in lieu of or in conjunction with the non-interactive proof-of-work problem. The interactive proof-of-work problem is designed to be presented in a user interface of the client device 110 and solved by a user operating the client device 110 by interacting with the user interface. The interactive proof-of-work problems can involve visual objects with different sizes, shapes or colors. Solving the visual proof-of-work problems may involve dragging or moving one or more objects in the user interface. The interactive proof-of-work problems may also involve interaction with other sense, such as sound. For example, solving such an interactive proof-of-work problem may involve matching audio clips, or matching an audio clip to a visual word or object displayed on the user interface. The client device 110 receives the solution through the user interface and records heuristic data associated with solving the problem. The solution and the heuristic data may be sent to the validating computing system 120 for validation.

The risk evaluation module 128 may access the stored solution in the online activity log 134 and may compare the received solution with the stored solution. In response to the stored solution matching the received solution, the risk evaluation module 128 may determine that the activity request 112 was requested via a legitimate client device 110. In response to identifying a missing solution or an incorrect solution, the risk evaluation module 128 may determine that the activity request 112 was requested via a client device 110 running an automated script, which may indicate that the activity request 112 may be a fraudulent activity request.

In some aspects, in addition to the received solution, the risk evaluation module 128 may evaluate the heuristic data sent along with the solution and other activity attributes in the online activity log 134 to determine whether the activity request 112 was fraudulent. Heuristic data may include the movement coordinates of an input device used to solve the visual proof-of-work, the amount of time in solving the problem, and other characteristics of the solution calculation. The movement coordinates may include a starting location, intermediate locations, and end location from an input device (such as a computer mouse) on a user interface of the client device 110. The risk evaluation module 128 may analyze the heuristic data to determine if the solution calculation was performed by a human user. The risk evaluation module 128 may provide a validation decision 118 to the online activity log 134 and to the online server system 102. The online server system 102 may deny or approve the activity request 112 based on the validation decision 118.

Note that the proof-of-work technologies presented herein can also be applied in other applications, such as categorizing and identifying types of activities. For example, they could be used for detecting abnormal interactions (which may or may not be related to fraud). These could also be used to detect system: controlled, assisted, or influenced interactions. An example is a technique called multi-boxing where the actor is in control of the device, but it also simultaneously controls multiple applications or devices at once. The verification system could trigger proof-of-work challenges to groups of clients who have the same start times. If they all solve the challenge, in the same way, multi-boxing could be detected. Additional details regarding validating online activities via proof-of-work techniques are provided below with respect of FIGS. 2-7.

Each communication within the computing environment 100 may occur over one or more networks 130. A network 130 may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or a combination of wireless interfaces. A wired network may include a wired interface. The wired or wireless networks may be implemented using routers, access points, bridges, gateways, or the like, to connect devices in the network.

In some aspects, the network 130 includes communication technologies and protocols such as Ethernet, 802.11, worldwide interoperability for microwave access (WiMAX), 3G, 4G, code division multiple access (CDMA), digital subscriber line (DSL), etc. Examples of networking protocols used for communicating via the network 130 may include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 130 may be represented using any suitable format, such as hypertext markup language (HTML) or extensible markup language (XML). In some aspects, some or all of the communication links of the network 130 may be encrypted using any suitable technique or techniques.

Figure 2:
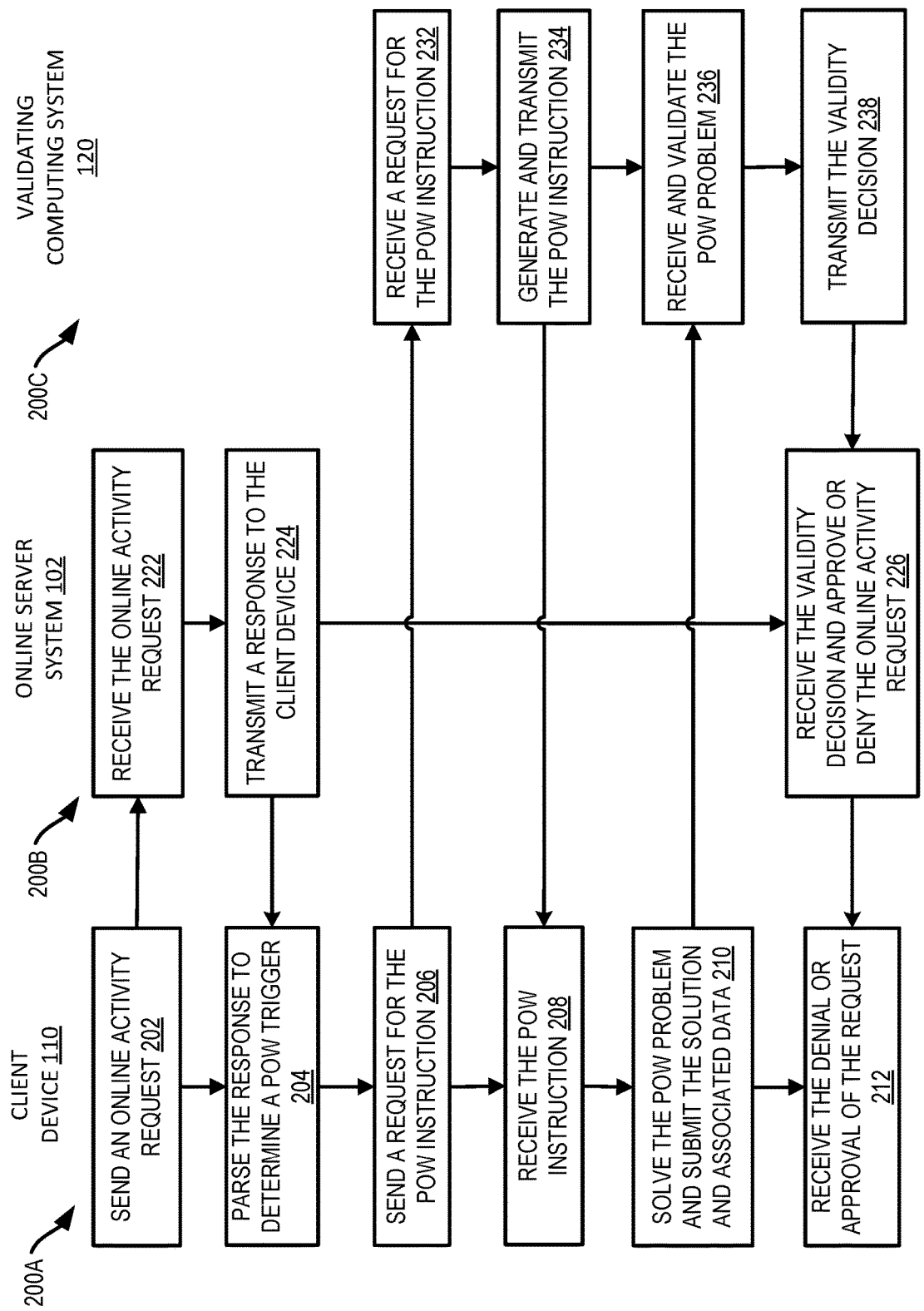
FIG. 2 includes several flow diagrams that illustrate several processes for validating online activities through proof-of-work techniques, according to some aspects described herein.
Figure 3:
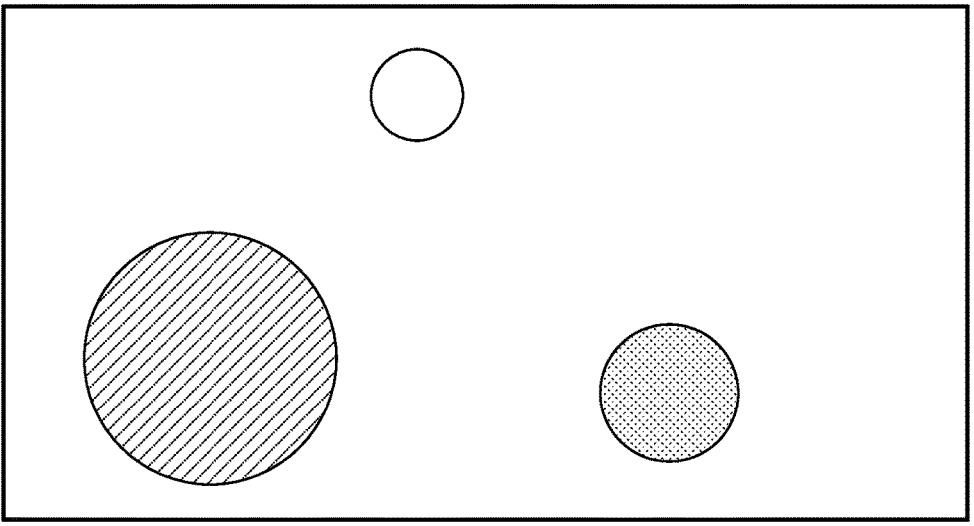
FIG. 3 shows an example of a user interface for online user account login configured with a proof-of-work mechanism, according to some aspects described herein.
Figure 4:
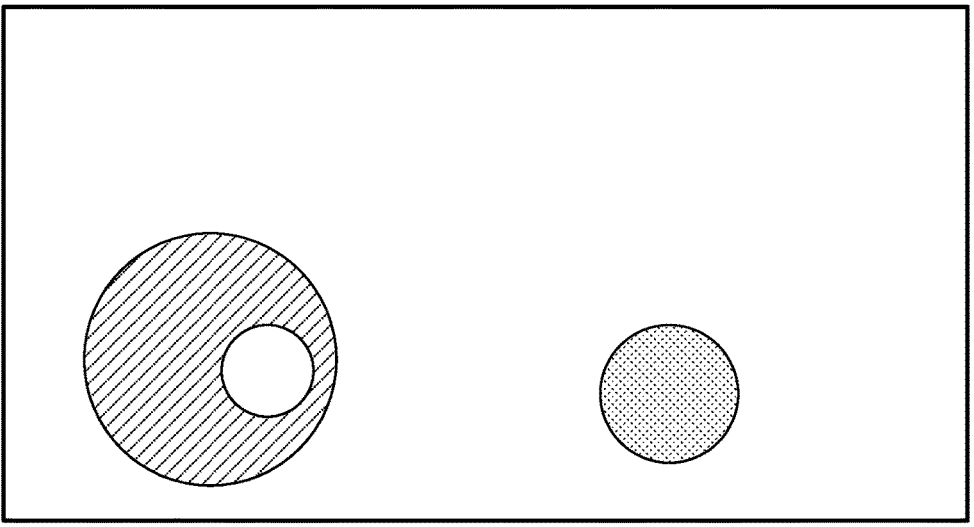
FIG. 4 shows an example of the user interface of FIG. 3 after a user filled in the login credentials and solved the interactive proof-of-work problem in the user interface, according to some aspects described herein.

Examples of Operations for Validating Online Activities Through Proof-Of-Work Techniques FIG. 2 includes several flow diagrams that illustrate several processes 200A, 200B, and 200C for validating online activities through proof-of-work techniques, according to some aspects described herein. FIG. 2 will be described together with FIGS. 3-5. FIG. 3 is an example of a user interface for an online user account login configured with a proof-of-work mechanism, according to some aspects described herein. FIG. 4 is an example of the user interface of FIG. 3 after a user filled in the login credentials and solved the visual proof-of-work problem in the user interface, according to some aspects described herein. FIG. 5 is an example of the heuristic data collected during the process of solving the proof-of-work problem in FIG. 3, according to some aspects described herein. FIGS. 2-5 will be described with respect to the systems shown in FIG. 1; however any suitable system according to this disclosure may be employed. In particular, the process 200A illustrates aspects of a client device 110; the process 200B illustrates aspects of the online server system 102; and the process 200C illustrates aspects of the validating computing system 120. The processes 200A, 200B, and 200C are described together below.

At block 202, the client device 110 sends an online activity request to the online server system 102. In some aspects, the online activity request may be the activity request 112 depicted in FIG. 1. Examples of the online activity request may include requests to conduct a transaction, log in to an application, change a password, submit an application, or perform any other action which utilizes a resource provided by the online server system 102.

At block 222, the online server system 102 receives the online activity request from the client device 110. In some aspects, the online server system 102 may then send attributes of the online activity request to the validating computing system 120 for logging the online activity request in the online activity log 134.

At block 224, the online server system 102 transmits a response to the client device 110. The response may include information typically associated with a response for the online activity request. For example, if the online activity requests a log in, the response may include username and password fields. The response may also include a proof-of-work trigger. The proof-of-work trigger may include a directive to request a proof-of-work instruction 114.

At block 204, the client device 110 may parse the response to determine a proof-of-work trigger. If the client device 110 is an automated script, the client device 110 may not parse the response and determine that the response contains a proof-of-work trigger to request the proof-of-work instruction 114, and thus may not request the proof-of-work instruction 114. If the client device 110 is a legitimate user device, the client device 110 may parse the response and determine that the response contains a proof-of-work trigger to request the proof-of-work instruction.

At block 206, the client device may, in response to parsing the response to determine a proof-of-work trigger, send a request for the proof-of-work instruction 114 to the validating computing system 120. At block 232, the validating computing system 120 may receive the request for the proof-of-work instruction 114. At block 234, the validating computing system 120 may generate and transmit the proof-of-work instruction 114 to the client device 110. The proof-of-work instruction 114 may include a problem for the client device 110 to solve. The problem may be dynamically selected by the system. The problem type and problem arguments may each be selected dynamically. The problem may be configured to be easily solvable by a client device, but difficult to predict by an automated script. The problem type may include an arithmetic problem, a cryptographic puzzle, a sortable list, other solvable problem, or some combination thereof.

For example, the problem in the proof-of-work instruction, such as the cryptographic puzzle, may include a problem of finding a number which is less than a target difficulty. The client device 110 can begin the proof-of-work problem with a dynamic value, such as a session ID, and perform n-hashing operations to find a solution. The difficulty can be adjusted by the validating system 120. In some examples, low difficulty targets may require a certain number of hashing operations (e.g., $10^3$), where medium difficulty could take a much higher number of operations (e.g., $10^9$), and hard difficulties could be computationally infeasible. Since most of the context of the proof-of-work is known to both the client device 110 and the validating system 120. For example, the seed value and difficulty are generated by the validating system 120 and provided in the proof-of-work instruction to the client device 110. The client device 110 must provide the nonce (or random number) which satisfies the difficulty target to the validating system 120. The validating system 120 verifies the solution as follows: create digest of the seed value and nonce, such as the hexdigest; convert the digest to integer as the result of proof-of-work; calculate target difficulty if it has not been calculated and stored; test if result of proof-of-work is smaller than the target difficulty.

The problem may be solved without human intervention by the client device 110 as a non-interactive proof-of-work problem. In some aspects, the problem may be an interactive proof-of-work problem involving visual objects with different sizes, shapes, or colors or involving audio. The problem may also involve interaction with other senses. The interactive proof-of-work problem may be presented in a user interface of the client device 110 to be solved by a user through interacting with the user interface.

The validating computing system 120 may execute the problem to generate a correct solution to the problem. In some aspects, the validating computing system 120 may have previously executed multiple problems and stored the correct solutions in conjunction with the respective problems. The validating computing system 120 may store the solution with the attributes of the online activity request. Thus, the stored solution may be retrievable by the validating computing system 120 for verification of a solution received from the client device 110.

At block 208, the client device may receive the proof-of-work instruction 114. In some aspects, the problem included in the proof-of-work instruction 114 may be a non-interactive problem. That is, the problem may be solved by the client device 110 without user interaction. In some aspects, a user of the client device 110 may be unaware that the client device receives and solves the non-interactive problem. Alternatively, or additionally, the proof-of-work instruction 114 may include an interactive puzzle for the user to solve. The interactive puzzle may be displayed on a user interface of the client device 110. A user may solve the interactive puzzle by interacting with the user interface. The interactive puzzle may be relatively easy for a human user to solve, but may be difficult or time-consuming for an automated script to solve. Examples of interactive problems may include fit puzzles, order puzzles, or replicate puzzles. In some aspects, the proof-of-work instruction 114 may include both a non-interactive problem solvable by the client device 110 as well as an interactive puzzle solvable by a user operating the client device 110.

In some aspects, the proof-of-work instruction 114 may include a directive for the client device 110 to capture data associated with the client device 110 solving the problem. For example, if the proof-of-work instruction 114 includes a non-interactive problem, the associated data may include an amount of time that was taken by the client device 110 for solving the non-interactive problem. If the proof-of-work instruction 114 includes an interactive puzzle, the associated data may be include heuristic data. The heuristic data may be used to determine if the interactive puzzle was solved by a human user rather than an automated script.

For example, a client device 110 may receive a proof-of-work instruction 114 in response to an online user account login request. FIG. 3 depicts an example of a user interface for online user account login configured with a proof-of-work mechanism. In this example, the proof-of-work for the online user account login includes an interactive proof-of-work, which is a fit puzzle that involves putting objects together to match an expected outcome. The fit puzzle instructs the user to "place the smallest shape inside the largest shape." In other examples of fit puzzles, the instructions may involve a picture of the expected completion state for the user to match. The fit puzzle includes three circles of varying sizes and shadings. A user may interact with the user interface to manipulate the position of the three circles. In some aspects, the proof-of-work for the online user account login may further include a non-interactive proof-of-work problem that is transparent to the user. The non-interactive proof-of-work problem are not visible on the user interface for the user, and the client device 110 may solve the non-interactive proof-of-work problem without the user's knowledge.

At block 210, the client device 110 may solve the proof-of-work problem and submit the solution and associated data to the validating computing system 120. In the example depicted in FIG. 3, the user may interact with the user interface to move the circles to solve the proof-of-work puzzle. The user may correctly solve the proof-of-work puzzle by moving the smallest circle onto the largest circle. An automated script, on the other hand, may not recognize the interactive proof-of-work puzzle, or unable to solve this puzzle. For some advanced scripts, it may be programmed to solve the interactive puzzle such as that shown in FIG. 3. However, the way that these automated scripts solve the interactive puzzle may be in a non-human-like manner. For instance, an automated script may directly position the smallest shape onto the largest shape instantaneously without mouse movements between the starting position and the end position. Heuristic data collected by the client device 110 may indicate mouse movements (or lack of mouse movements) that may not be achieved by a human user.

In some examples, the fit puzzle may include dynamic behavior. In the fit puzzle shown in FIG. 3, as the user moves the smallest circle towards the largest circle, the largest circle may "run away" from the smallest circle on a first interaction. The user may successfully place the smallest circle inside the largest circle on subsequent interactions without any movement by the largest circle. This dynamic behavior may increase difficulty for solving by automated scripts without significantly increasing difficulty for human users.

FIG. 4 depicts a solved version of the proof-of-work puzzle of FIG. 3, after the user has inputted a username and password into the username field and password field and moved the smallest circle onto the largest circle to complete the proof-of-work puzzle. For this example, the associated data may include heuristic data of mouse movements performed by a user solving the proof-of-work puzzle. FIG. 5 depicts a data capture example including mouse starting coordinates and a coordinate path of the mouse as the user is solving the proof-of-work puzzle. FIG. 5 also depicts the target coordinate for the smallest circle (labelled "SHAPE TARGET"), the actual coordinate at which the user placed the smallest circle (labelled "SHAPE FIT"), and the coordinates of a shape noise (labelled "SHAPE NOISE"), such as the object shown at the lower right corner of FIG. 3. Other heuristic data collected may include a length of time taken to solve the problem.

At block 236, the validating computing system 120 receives and validates the solution to the proof-of-work problem from the client device 110. In some aspects, the validating computing system 120 may also receive the associated data. If the validating computing system 120 has already executed the problem to generate the solution, the validating computing system 120 may access the stored solution to compare to the received solution. Alternatively, the validating computing system 120 may now execute the problem to generate the correct solution to compare to the received solution. If the received solution matches the correct solution, the validating computing system 120 may validate the proof-of-work problem. If the received solution does not match the correct solution, the validating computing system 120 may not validate the proof-of-work problem. In some aspects where the proof-of-work problem is an interactive proof-of-work problem and the received solution is an incorrect solution, the validating computing system 120 may validate the proof-of-work problem if the associated data indicates that the client device 110 is legitimate. If the validating computing system 120 does not receive a solution, the validating computing system 120 may not validate the proof-of-work problem. If the validating computing system 120 receives a solution that matches the correct solution but was not solved within a predetermined threshold amount of time, the validating computing system 120 may not validate the proof-of-work problem. In response to a missing or incorrect solution, the validating computing system 120 may determine that the online activity request was requested via a client device 110 running an automated script, which may indicate that the online activity request may be fraudulent.

In some aspects, the validating computing system 120 may also determine if the online activity request is fraudulent using the associated data. For example, if the problem was a non-interactive problem, the associated data may indicate that the proof-of-work problem was solved in an amount of time that was under a lower threshold, or in an amount of time that was over a higher threshold. This may indicate that an automated script was attempting to solve the proof-of-work problem. The thresholds may vary depending on the characteristics of the client device 110, such as the type, model, operating system, etc. Alternatively, if the problem was an interactive puzzle, the heuristic data may include characteristics that may not be creatable by a human user. In the example depicted in FIG. 5, heuristic data includes the X and Y coordinate paths that indicate mouse movements that may reasonably be performed by a human user. Mouse coordinate data captured on an automated script may include mouse coordinates that could not be performed by a human user, such as instantaneously moving the mouse between coordinates that are not proximate to each other. It may also be unlikely for a human user to move the smaller circle to the exact target coordinate, and thus a matching target coordinate and actual coordinate may indicate that an automated script solved the interactive puzzle. The client device 110 may send a correct solution and heuristic data indicating a non-human user to the validating computing system 120, and the validating computing system 120 may determine that the client device 110 performing a fraudulent online activity request.

At block 238, the validating computing system 120 transmits the validity decision to the online server system 102. In some aspects, the validity decision may be the validation decision 118 depicted in FIG. 1. The validity decision may be the determination for whether or not the client device 110 is performing a fraudulent online activity request.

At block 226, the online server system 102 receives the validity decision and approves or denies the online activity request based on the validity decision. If the validity decision determines that the online activity request is fraudulent, the online server system 102 may deny the online activity request. If the validity decision determines that the online activity request is not fraudulent, the online server system 102 may approve the online activity request.

At block 212, the client device 110 may receive the denial or approval of the online activity request. If the online activity request is approved, the online activity request may be completed by the client device 110. In some aspects, an approved or denied online activity request may trigger the client device 110 to send another request for proof-of-work instruction 114 to the validating computing system 120 for receiving another proof-of-work problem. For example, if the online activity request is determined to be fraudulent or to be of a high risk, the online server system 102 may be configured to trigger the client device 110 to send a request for another proof-of-work instruction 114. In some aspects, the subsequent proof-of-work problems may scale upwards in difficulty. For example, a first problem sent to the client device 110 may be a non-interactive problem with a lower difficulty. The second proof-of-work problem sent to the client device 110 may be an interactive puzzle with a higher difficulty. Alternatively, the first problem may be an interactive puzzle, and the second problem may be a non-interactive problem. One or more problems may be sent in a single proof-of-work instruction 114. For example, a proof-of-work instruction 114 may include both a non-interactive problem and an interactive puzzle.

In some aspects of the present disclosure, one or more operations shown in FIG. 2 may be omitted or performed in a different order. Similarly, additional operations not shown in FIG. 2 may be performed.

Figure 6:
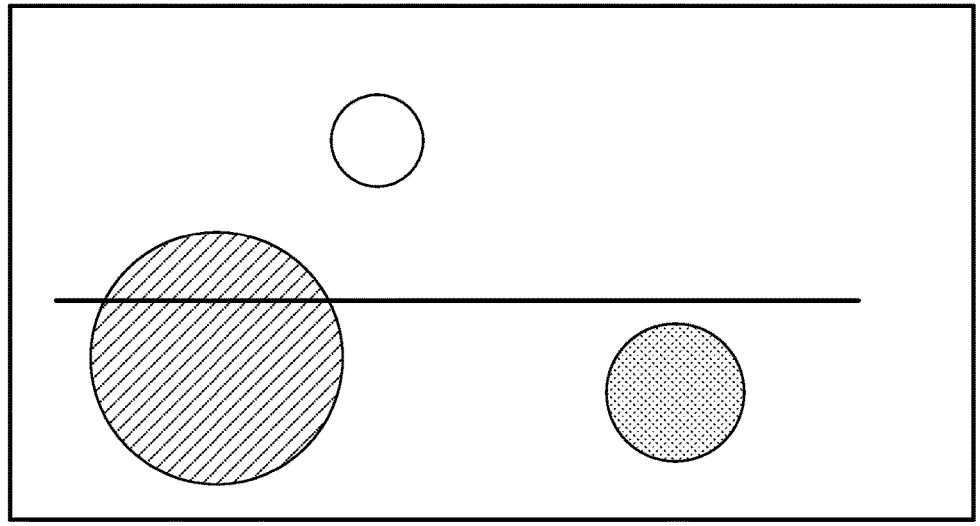
FIG. 6 shows an example of an order puzzle used in an interactive proof-of-work problem for validating online activities, according to some aspects described herein.
Figure 6:
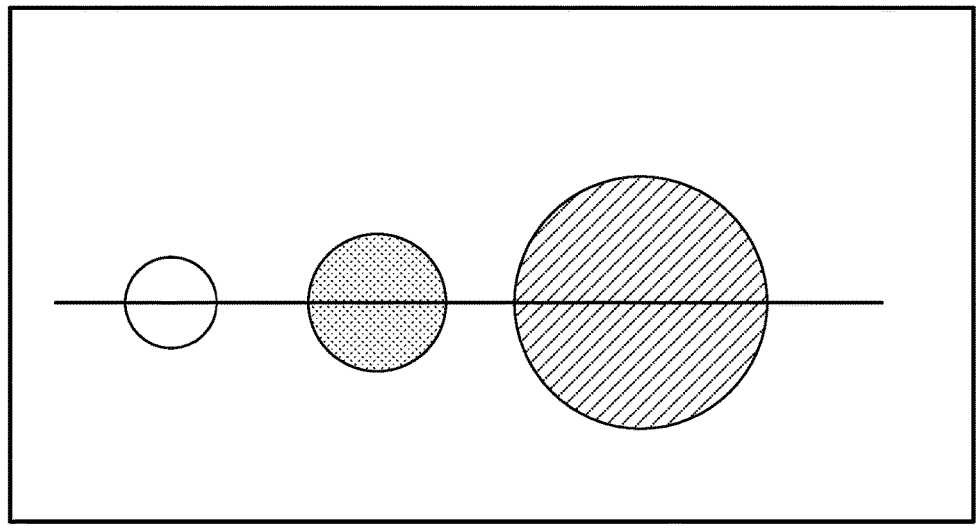

The interactive proof-of-work problem shown in FIG. 3 is for illustration purposes and should not be construed as limiting. Various other types of interactive proof-of-work problems may be used. For example, FIG. 6 shows an example of an order puzzle used in an interactive proof-of-work problem for validating online activities, according to some aspects described herein. An order puzzle may involve numeric ordering, a lexical ordering, or a size-based ordering of objects. The order puzzle depicted in FIG. 6 may be a size-based ordering presented to a user on a user interface of a client device 110. The user may interact with the user interface to solve the order puzzle. FIG. 6 depicts the order puzzle before and after being solved.

The order puzzle depicts instructions for the user to "order the shapes from smallest to largest (left to right) on the guideline. In other examples of order puzzles, the instructions may involve a picture of the expected completion state for the user to match. The order puzzle includes a horizontal guideline and three circles of varying sizes and shadings. A user may select and move the circles to solve the order puzzle. The solved order puzzle depicts the three circles arranged along the horizontal guideline from smallest to largest, from left to right. As the user is solving the puzzle, the client device 110 may be capturing heuristic data to be sent to the validating computing system 120 to aid in a validation decision 118. For example, the heuristic data may include the final positioning of the circles along the horizontal guideline. It may be unlikely for a human user to precisely line up a midpoint of each circle onto the horizontal guideline. The validating computing system 120 may determine that a moderately imprecise solution indicates a human user solved the order puzzle rather than an automated script.

Figure 7:
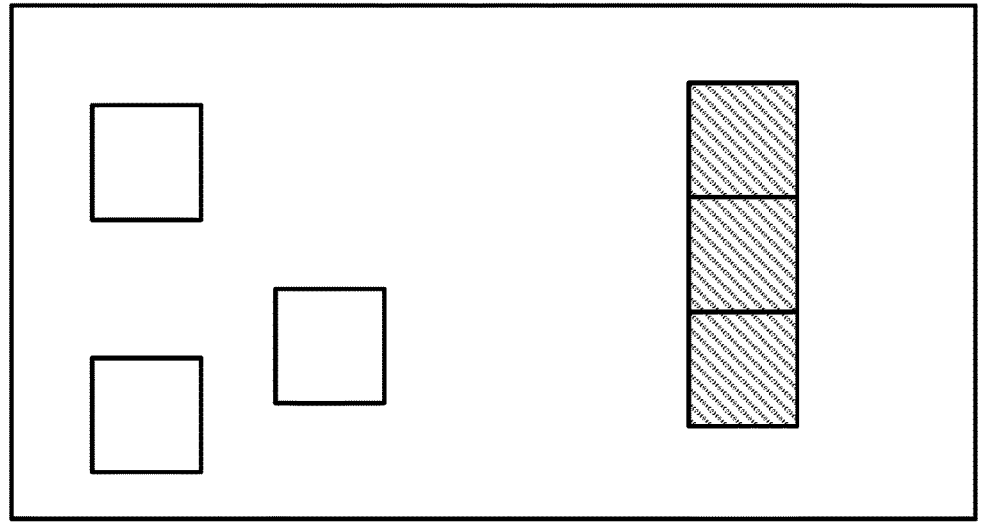
FIG. 7 shows an example of a replicate puzzle used in an interactive proof-of-work problem for validating online activities, according to some aspects described herein.
Figure 7:
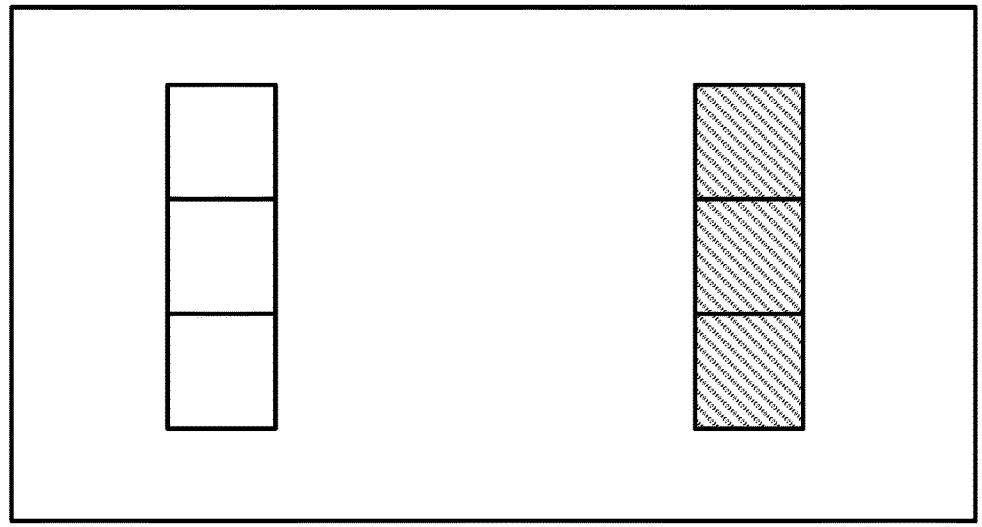

FIG. 7 shows an example of a replicate puzzle used in an interactive proof-of-work problem for validating online activities, according to some aspects described herein. A replicate puzzle may involve using a set of objects to replicate an expected outcome. The replicate puzzle depicted in FIG. 7 may be presented to a user on a user interface of a client device 110. The user may interact with the user interface to solve the replicate puzzle. FIG. 7 depicts the replicate puzzle before and after being solved.

The replicate puzzle depicts instructions for the user to "recreate the shape on the right with the shapes on the left." In other examples of replicate puzzles, the instructions may involve a picture of the expected completion state for the user to match. The replicate puzzle may include three unordered squares on the left and three vertically stacked squares on the left. A user may select and move the squares on the left to solve the replicate puzzle. The solved replicate puzzle depicts the three squares on the left in a vertical stack, in the same manner as the three vertically stacked squares on the left. As the user is solving the puzzle, the client device may be capturing heuristic data to be sent to the validating computing system 120. For example, the heuristic data may include the final positioning of the squares on the left. As with the order puzzle depicted in FIG. 6, it may be unlikely for a human user to stack the squares on the left with pixel-perfect accuracy. The validating computing system 120 may determine that a moderately imprecise solution indicates a human user solved the replicate puzzle rather than an automated script.

Figure 8:
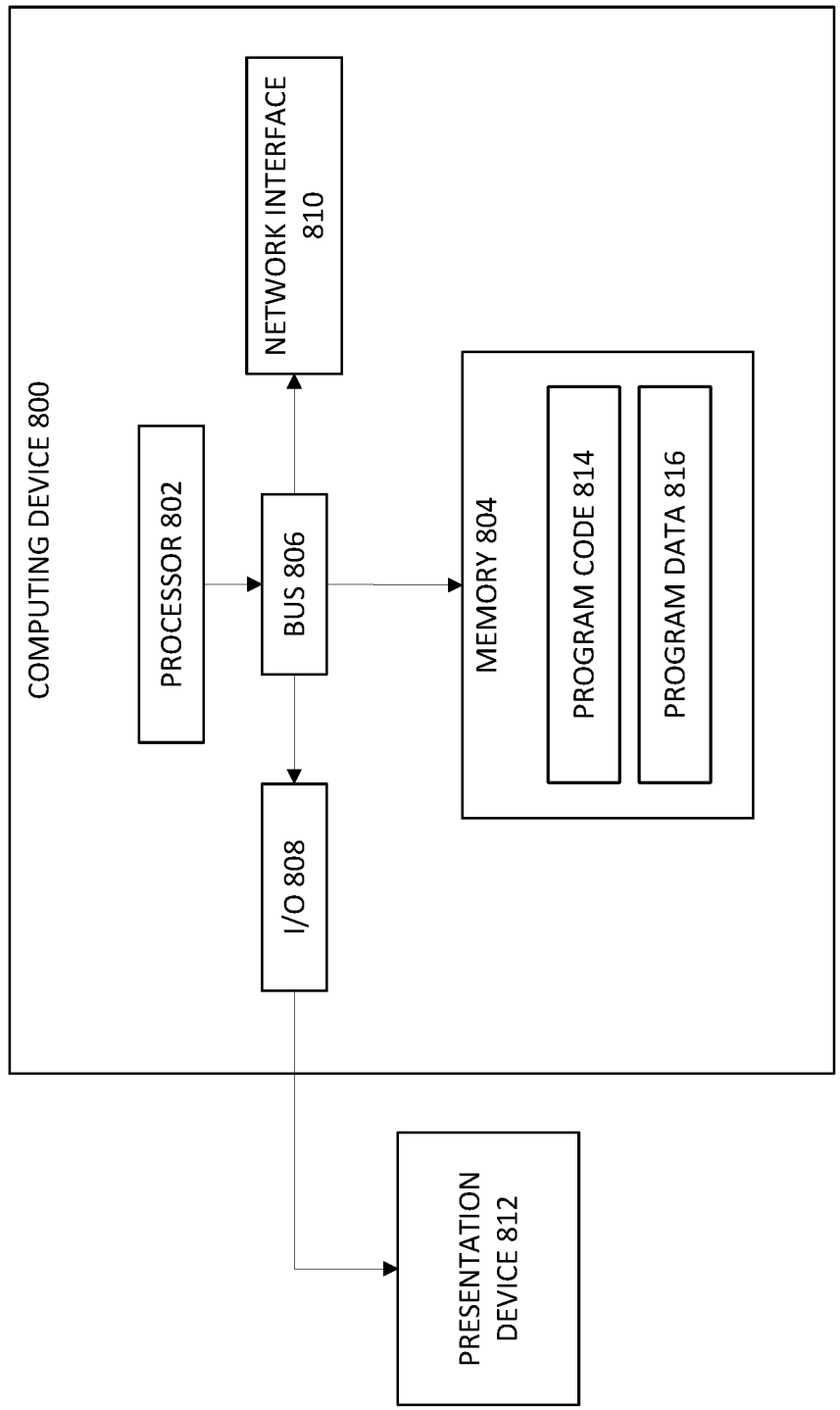
FIG. 8 is a diagram depicting an example of a computing system suitable for implementing aspects of the techniques and technologies described herein.

Example of a Computing System for Validating
Online Activities Through Proof-Of-Work
Techniques Any suitable computing system or group of computing systems can be used to perform the operations for the machine-learning operations described herein. For example, FIG. 8 is a block diagram depicting an example of a computing device 800, which can be used to implement the validating computing system 120, the online server system 102, and/or the client devices 110. The computing device 800 can include various devices for communicating with other devices in the computing environment 100, as described with respect to FIG. 1. The computing device 800 can include various devices for performing one or more operations described above with reference to FIGS. 1-7.

The computing device 800 can include a processor 802 that is communicatively coupled to a memory 804. The processor 802 executes computer-executable program code 814 stored in the memory 804, accesses program data 816 stored in the memory 804, or both. Program code 814 may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others.

Examples of a processor 802 include a microprocessor, an application-specific integrated circuit, a field-programmable gate array, or any other suitable processing device. The processor 802 can include any number of processing devices, including one. The processor 802 can include or communicate with a memory 804. The memory 804 stores program code that, when executed by the processor 802, causes the processor to perform the operations described in this disclosure.

The memory 804 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, ROM, RAM, an ASIC, magnetic storage, or any other medium from which a computer processor can read and execute program code. The program code may include processor-specific program code generated by a compiler or an interpreter from code written in any suitable computer-programming language. Examples of suitable programming language include Hadoop, C, C++, C#, Visual Basic, Java, Python, Perl, JavaScript, ActionScript, etc.

The computing device 800 may also include a number of external or internal devices such as input or output devices. For example, the computing device 800 is shown with an input/output interface 808 that can receive input from input devices or provide output to output devices. A bus 806 can also be included in the computing device 800. The bus 806 can communicatively couple one or more components of the computing device 800.

The computing device 800 can execute program code 814 that includes the proof-of-work generator 126 and/or the risk evaluation module 128. The program code 814 for the proof-of-work generator 126 and/or the risk evaluation module 128 may be resident in any suitable computer-readable medium and may be executed on any suitable processing device. Executing the proof-of-work generator 126 or the risk evaluation module 128 can configure the processor 802 to perform the operations described herein.

In some aspects, the computing device 800 can include one or more output devices. One example of an output device is the network interface 810 depicted in FIG. 8. A network interface 810 can include any device or group of devices suitable for establishing a wired or wireless data connection to one or more data networks described herein, such as the network 130. Non-limiting examples of the network interface 810 include an Ethernet network adapter, a modem, etc.

Another example of an output device can be the presentation device 812 depicted in FIG. 8. A presentation device 812 can include any device or group of devices suitable for providing visual, auditory, or other suitable sensory output. Non-limiting examples of the presentation device 812 include a touchscreen, a monitor, a speaker, a separate mobile computing device, etc. In some aspects, the presentation device 812 can include a remote client-computing device that communicates with the computing device 800 using one or more data networks described herein, such as the network 130. In other aspects, the presentation device 812 can be omitted.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

What is claimed is:

1. A method comprising one or more processing devices performing operations comprising:
    determining that an online activity request does not originate from an automated script;
    receiving, from a client device, a request for a proof-of-work instruction, wherein the request is associated with the online activity request submitted to an online server system to request performing an online activity in an online computing environment provided by the online server system;
    in response to determining that the online activity request does not originate from the automated script and receiving the request for the proof-of-work instruction, generating a first proof-of-work instruction, wherein the first proof-of-work instruction specifies a first problem to be presented in a user interface of the client device and solved by a user operating the client device via the user interface;
    transmitting the first proof-of-work instruction to the client device;
    receiving, from the client device, a first response to the first proof-of-work instruction, wherein the first response comprises a first solution to the first problem and first heuristic data associated with solving the first problem at the client device;
    determining that the first problem is solved by determining that the first solution of the first problem matches a correct solution and that the first heuristic data indicates that the first solution is provided by a human via the user interface, wherein the first heuristic data comprises first mouse movements used to solve the first problem;
    in response to receiving the first response to the first proof-of-work instruction, generating a second proof-of-work instruction that specifies a second problem to be solved by the client device without human intervention, wherein the second problem requires more computational operations than the first problem;
    transmitting the second proof-of-work instruction to the client device;
    receiving, from the client device, a second response to the second proof-of-work instruction, wherein the second response comprises second heuristic data associated with solving the second problem;
    generating a validity decision based on determining that the first problem is solved based on the first heuristic data and the second problem is solved based on the second heuristic data, wherein the second heuristic data indicates that a second solution to the second proof-of-work instruction is correct; and
    transmitting, to the online server system, the validity decision for use in granting the online activity request to perform the online activity in the online computing environment.

2. The method of claim 1, wherein generating the validity decision is further based on determining that the response to the proof-of-work instruction correctly solves the first problem within a threshold amount of time period.

3. The method of claim 2, wherein the threshold amount of time period comprises a lower threshold that an amount of time for solving the first problem is within the threshold amount of time period if the amount of time is above the lower threshold or an upper threshold that an amount of time for solving the first problem is within the threshold amount of time period if the amount of time is below the upper threshold.

4. The method of claim 2, wherein the threshold amount of time period is determined based on characteristics of the client device.

5. The method of claim 1, further comprising:
   determining that the client device fails to solve the second problem by determining one or more of the client device did not solve the second problem, the client device incorrectly solved the second problem, or the client device did not solve the second problem within a threshold amount of time; and
   generating an invalidity decision based on determining that the client device failed to solve the second problem; and
   transmitting, to the online server system, the invalidity decision for use in denying the online activity request to perform the online activity in the online computing environment.

6. The method of claim 1, further comprising:
   generating a third proof-of-work instruction in response to the request, wherein the third proof-of-work instruction specifies a third problem to be presented in a user interface of the client device and solved by a user operating the client device via the user interface;
   transmitting the third proof-of-work instruction to the client device in conjunction with the proof-of-work instruction; and
   receiving, from the client device, a third response to the third proof-of-work instruction, wherein the validity decision is generated based on determining that the client device correctly solves the first problem, the second problem, and the third problem.

7. The method of claim 1, wherein the second proof-of-work instruction is generated dynamically so that the first problem is different from another problem specified by another proof-of-work instruction generated by in response to another request for a proof-of-work instruction.

8. A system, comprising:
   a processor device; and
   a non-transitory computer-readable storage medium having program code that is executable by the processor device to cause the processor device to perform operations, the operations comprising:
   determining that an online activity request does not originate from an automated script;
   receiving, from a client device, a request for a proof-of-work instruction, wherein the request is associated with the online activity request submitted to an online server system to request performing an online activity in an online computing environment provided by the online server system;
   in response to determining that the online activity request does not originate from the automated script and receiving the request for the proof-of-work instruction, generating a first proof-of-work instruction, wherein the first proof-of-work instruction specifies a first problem to be presented in a user interface of the client device and solved by a user operating the client device via the user interface;
   transmitting first the proof-of-work instruction to the client device;
   receiving, from the client device, a first response to the first proof-of-work instruction, the first response comprising a first solution to the first problem and first heuristic data associated with solving the first problem at the client device;
   determining that the first problem is solved by determining that the first solution of the first problem matches a correct solution and that the first heuristic data indicates that the first solution is provided by a human via the user interface, wherein the first heuristic data comprises first mouse movements used to solve the first problem;
   in response to receiving the first response to the first proof-of-work instruction, generating a second proof-of-work instruction that specifies a second problem to be solved by the client device without human intervention, wherein the second problem requires more computational operations than the first problem;
   transmitting the second proof-of-work instruction to the client device;
   receiving, from the client device, a second response to the second proof-of-work instruction, wherein the second response comprises second heuristic data associated with solving the second problem;
   generating a validity decision based on determining that the first problem is solved based on the first heuristic data and the second problem is solved based on the second heuristic data, and wherein the second heuristic data indicates that a second solution to the second proof-of-work instruction is correct; and
   transmitting, to the online server system, the validity decision for use in granting the online activity request to perform the online activity in the online computing environment.

9. The system of claim 8, wherein the first heuristic data comprise one or more of a starting location, an intermediate location, or an end location of an input device in the user interface that is used by the user when solving the first problem.

10. The system of claim 8, wherein the first problem comprises an interactive puzzle involving a plurality of objects.

11. The system of claim 10, wherein the interactive puzzle comprises a fit puzzle involving putting together at least one object to match an expected outcome, an order puzzle involving a numeric ordering, a lexical ordering, or a size-based ordering of the plurality of objects, or a replicate puzzle involving using a set of objects to replicate an expected outcome.

12. The system of claim 8, wherein the operations further comprise:
   generating a third proof-of-work instruction, wherein the third proof-of-work instruction specifies a third problem to be solved by the client device without human intervention;
   transmitting the third proof-of-work instruction to the client device in conjunction with the first proof-of-work instruction; and
   receiving, from the client device, a third response to the third proof-of-work instruction, wherein the validity decision is generated based on determining that the client device correctly solves the third problem.

13. The system of claim 8, wherein generating the validity decision is further based on:
   determining that the first response to the first proof-of-work instruction correctly solves the first problem within a threshold amount of time period.

14. The system of claim 13, wherein the threshold amount of time period comprises a lower threshold that an amount of time for solving the first problem is within the threshold amount of time period if the amount of time is above the lower threshold or an upper threshold that an amount of time for solving the first problem is within the threshold amount of time period if the amount of time is below the upper threshold.

15. A non-transitory, computer readable storage medium having program code that is executable by a processor device to cause a computing device to perform operations, the operations comprising:
  determining that an online activity request does not originate from an automated script;
  receiving, from a client device, a request for a proof-of-work instruction, wherein the request is associated with the online activity request submitted to an online server system to request performing an online activity in an online computing environment provided by the online server system;
  in response to determining that the online activity request does not originate from the automated script and receiving the request for the proof-of-work instruction, generating a first proof-of-work instruction, wherein the first proof-of-work instruction specifies a first problem to be presented in a user interface of the client device and solved by a user operating the client device via the user interface;
  transmitting the first proof-of-work instruction to the client device;
  receiving, from the client device, a first response to the first proof-of-work instruction, wherein the first response comprises a first solution to the first problem and first heuristic data associated with solving the first problem at the client device;
  determining that the first problem is solved by determining that the first solution of the first problem matches a correct solution and that the first heuristic data indicates that the first solution is provided by a human via the user interface, wherein the first heuristic data comprises first mouse movements used to solve the first problem;
  in response to receiving the first response to the first proof-of-work instruction, generating a second proof-of-work instruction that specifies a second problem to be solved by the client device without human intervention, wherein the second problem requires more computational operations than the first problem;
  transmitting the second proof-of-work instruction to the client device;
  receiving, from the client device, a second response to the second proof-of-work instruction, wherein the second response comprises second heuristic data associated with solving the second problem;
  generating a validity decision based on determining that the first problem is solved based on the first heuristic data and the second problem is solved based on the second heuristic data, wherein the second heuristic data indicates that a second solution to the second proof-of-work instruction is correct; and
  transmitting, to the online server system, the validity decision for use in granting the online activity request to perform the online activity in the online computing environment.

16. The non-transitory, computer-readable storage medium of claim 15, wherein generating the validity decision is further based on:
  determining that the response to the first proof-of-work instruction correctly solves the first problem within a threshold amount of time period.

17. The non-transitory, computer-readable storage medium of claim 16, wherein the threshold amount of time period comprises a lower threshold that an amount of time for solving the first problem is within the threshold amount of time period if the amount of time is above the lower threshold or an upper threshold that an amount of time for solving the first problem is within the threshold amount of time period if the amount of time is below the upper threshold.

18. The non-transitory, computer-readable storage medium of claim 16, wherein the threshold amount of time period is determined based on characteristics of the client device.

* * * * *